(12) United States Patent
Katsuno

(10) Patent No.: US 9,056,581 B2
(45) Date of Patent: Jun. 16, 2015

(54) ON-VEHICLE LIGHT DISTRIBUTION CONTROL SYSTEM

(75) Inventor: Toshiyasu Katsuno, Nagoya (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 246 days.

(21) Appl. No.: 13/823,547

(22) PCT Filed: Oct. 18, 2010

(86) PCT No.: PCT/JP2010/068293
§ 371 (c)(1),
(2), (4) Date: Mar. 14, 2013

(87) PCT Pub. No.: WO2012/053050
PCT Pub. Date: Apr. 26, 2012

(65) Prior Publication Data
US 2013/0175926 A1 Jul. 11, 2013

(51) Int. Cl.
*B60Q 1/08* (2006.01)
*B60Q 1/14* (2006.01)

(52) U.S. Cl.
CPC *B60Q 1/08* (2013.01); *B60Q 1/085* (2013.01); *B60Q 1/143* (2013.01); *B60Q 2300/056* (2013.01); *B60Q 2300/41* (2013.01); *B60Q 2300/42* (2013.01)

(58) Field of Classification Search
USPC .......................................... 340/982, 468, 469
See application file for complete search history.

(56) References Cited

U.S. PATENT DOCUMENTS

2008/0294315 A1* 11/2008 Breed ............................. 701/49
2009/0231867 A1   9/2009 Mochizuki

FOREIGN PATENT DOCUMENTS

| JP | 6-84099 A | 3/1994 |
|----|-----------|--------|
| JP | 10-86698 A | 4/1998 |
| JP | 2009-214812 A | 9/2009 |

* cited by examiner

*Primary Examiner* — Daniel Puentes
(74) *Attorney, Agent, or Firm* — Sughrue Mion, PLLC

(57) ABSTRACT

An on-vehicle light distribution control system (100) for controlling light distribution of headlights (3), includes a vehicle detecting unit (10) configured to detect a front vehicle (LV) travelling in front of a self-vehicle; a detection difficulty determining unit (12) configured to determine difficulty of the detection by the vehicle detecting unit (10); an operational condition changing unit (14) configured to change an operational condition of light distribution control according to a determination result of the detection difficulty determining unit (12); and a light distribution control state display unit (13) configured to display a present state of the light distribution control for which the operational condition is changed by the operational condition changing unit (14).

3 Claims, 15 Drawing Sheets

ON-VEHICLE LIGHT DISTRIBUTION CONTROL SYSTEM

CROSS REFERENCE TO RELATED APPLICATIONS

This application is a national Stage of International Application No. PCT/JP2010/06829, filed on Oct. 18, 2010, the contents of all which are incorporated herein by reference in their entirety.

TECHNICAL FIELD

The present invention is related to an on-vehicle light distribution control system that detects a vehicle travelling in front of the self-vehicle and controls light distribution of headlights according to the location of the detected vehicle, and more particularly to an on-vehicle light distribution control system that changes operational conditions of light distribution control according to the difficulty in detecting a vehicle.

BACKGROUND ART

Conventionally, there is known an inter-vehicular distance measuring device that takes, with an image sensor, an image of a leading vehicle travelling in front of the self-vehicle in the same direction as the self-vehicle, while the self-vehicle is travelling with the headlights on. Based on the taken image, the inter-vehicular distance between the self-vehicle and the leading vehicle is calculated. Based on the calculated inter-vehicular distance, the high/low beams of the headlights are switched, and the expansion and the light quantity of the light beams of the headlights are controlled (see, for example, patent document 1).

The inter-vehicular distance measuring device displays, on a display screen, the image of the leading vehicle (follow target vehicle) that the self-vehicle is to follow, while surrounding this image with a window. Accordingly, the driver can recognize which leading vehicle is selected as the follow target vehicle.

[Patent Document 1] Japanese Laid-open Patent Publication No. H6-84099

SUMMARY OF INVENTION

Problem to be Solved by Invention

However, patent document 1 only describes controlling headlights after one leading vehicle is accurately detected. Patent document 1 does not mention anything about controlling headlights in an environment where it is difficult to accurately detect a leading vehicle (for example, in an environment including an object that is mistakenly recognized as a leading vehicle).

Furthermore, the device of patent document 1 presents, to the driver, which leading vehicle is selected as a follow target vehicle. However, the headlights are controlled under the same operational conditions regardless of the difficulty in detecting a vehicle. Therefore, the present control state of the headlights is not presented to the driver.

The object of the present invention is to provide an on-vehicle light distribution control system that presents to the driver the present state of light distribution control of headlights for which the operational condition is changed according to the difficulty in detecting a vehicle.

Means to Solve the Problem

To achieve the above object, an on-vehicle light distribution control system according to an embodiment of the present invention is for controlling light distribution of headlights, the on-vehicle light distribution control system including a vehicle detecting unit configured to detect a front vehicle travelling in front of a self-vehicle; a detection difficulty determining unit configured to determine difficulty of the detection by the vehicle detecting unit; an operational condition changing unit configured to change an operational condition of light distribution control according to a determination result of the detection difficulty determining unit; and a light distribution control state display unit configured to display a present state of the light distribution control for which the operational condition is changed by the operational condition changing unit.

Effects of the Invention

According to the above means, the present invention can provide an on-vehicle light distribution control system that presents, to the driver, the present state of light distribution control of headlights for which the operational condition has changed according to the difficulty in detecting another vehicle.

BEST MODE FOR CARRYING OUT THE INVENTION

In the following, a best mode for carrying out the invention is described with reference to drawings.

Figure 1:
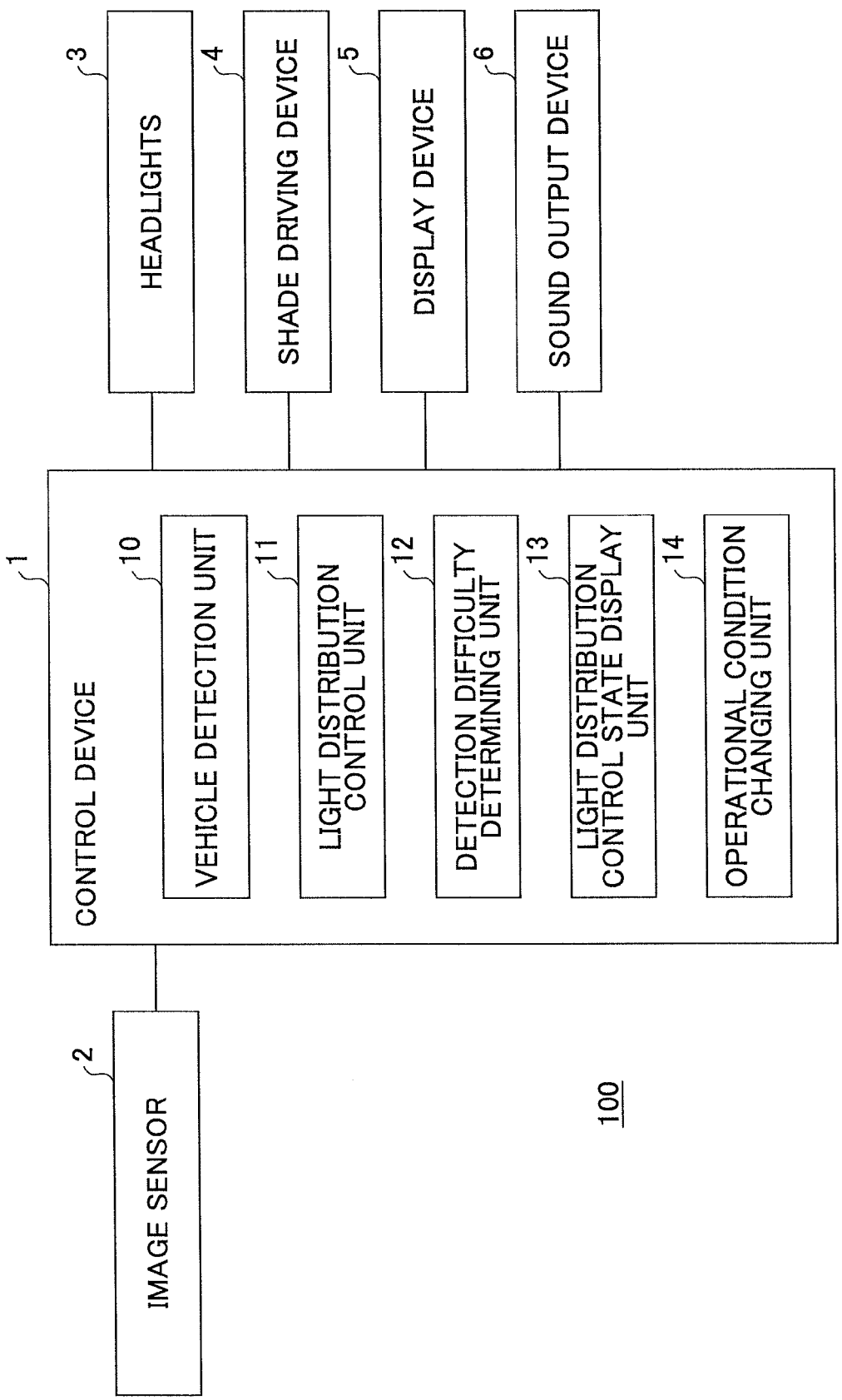
FIG. 1 is a block diagram indicating a configuration example of an on-vehicle light distribution control system according to an embodiment of the present invention.

FIG. 1 is a block diagram indicating a configuration example of an on-vehicle light distribution control system 100 according to an embodiment of the present invention.

The on-vehicle light distribution control system 100 is an on-vehicle device for performing light distribution control of headlights 3 based on output of an image sensor 2 for taking images of areas in front of a vehicle. The on-vehicle light distribution control system 100 is mainly constituted by a control device 1, the image sensor 2, the headlights 3, a shade driving device 4, a display device 5, and a sound output device 6.

The control device 1 is an on-vehicle computer including a CPU (Central Processing Unit), a RAM (Random Access Memory), a ROM (Read Only Memory), a NVRAM (Non Volatile Random Access Memory), etc. For example, programs respectively corresponding to a vehicle detection unit 10, a light distribution control unit 11, a detection difficulty determining unit 12, a light distribution control state display unit 13, and an operational condition changing unit 14 are stored in the ROM, and according to need, the programs are loaded in the RAM while causing the CPU to execute a process corresponding to the respective units. The vehicle detection unit 10, the light distribution control unit 11, the detection difficulty determining unit 12, the light distribution control state display unit 13, and the operational condition changing unit 14 may respectively be realized by hardware such as an ASIC (Application Specific Integrated Circuit).

The image sensor 2 is a device for taking images of areas in front of the vehicle. For example, the image sensor 2 is a camera provided with an image pickup device such as a CCD (Charge Coupled Device) and a CMOS (Complementary Metal Oxide Semiconductor). The image sensor 2 is attached at the top part of the windshield in the vehicle's interior, and outputs the taken images to the control device 1.

The headlights 3 are for radiating light to areas in front of the vehicle. For example, the headlights 3 are halogen valve type headlights, HID (High Intensity Discharge) headlights, and LED (Light Emitting Diode) headlights.

The shade driving device 4 is a device for driving the light shielding plates (shades) for shielding the light of part of the headlights 3. For example, the shade driving device 4 is a motor, a solenoid, or linear actuator for rotating a rotatable shade disposed in the light path of the headlights 3 or for moving in parallel the linear type shades disposed in the light path of the headlights 3.

Specifically, the shade driving device 4 drives a shade, which is provided near the light source of the headlights 3 and which shields part of the light from the headlights 3, based on control signals output from the control device 1, in order to create the respective light distribution patterns (for example, a high beam pattern, a low beam pattern, a leading vehicle following time pattern (described below), and an oncoming vehicle approaching time pattern (described below)) of the headlights 3 while the vehicle is travelling.

The display device 5 is a device for displaying various kinds of information output by the control device 1, and displaying the present light distribution control state of the headlights 3, for example (details are given below).

Figure 2:
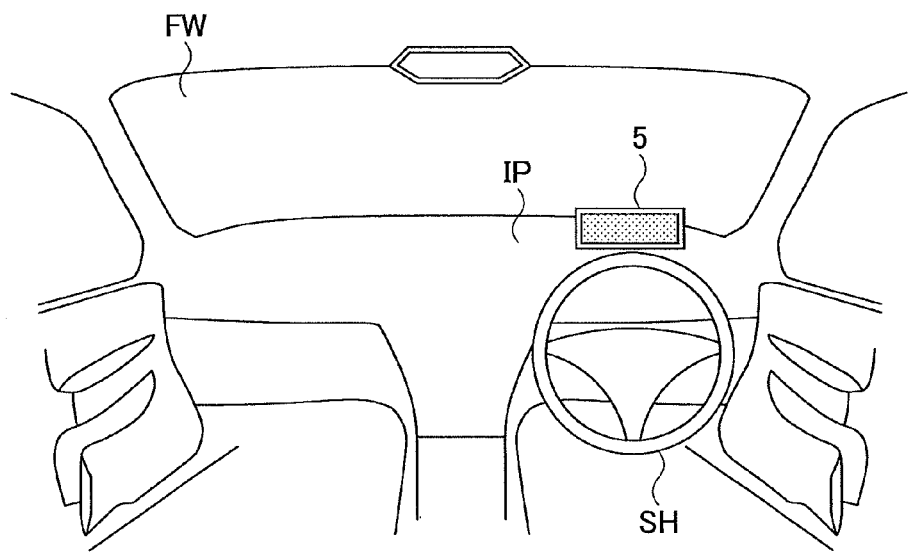
FIG. 2 indicates an installation example of a display device.

FIG. 2 indicates an installation example of the display device 5. The display device 5 is a liquid crystal display that is disposed at the top part of an installment panel IP across a steering wheel SH, so that the driver can easily view the display device 5 while the vehicle is travelling. The display device 5 may be a HUD (Head Up Display) that projects an image on the front window FW, or may be a display used in a car navigation system (in this case, the display device 5 is shared by the car navigation system and the on-vehicle light distribution control system 100).

The sound output device 6 is a device for outputting sounds of various kinds of information output from the control device 1. For example, the fact that the light distribution control state of the headlights 3 has been switched, or the operational condition of light distribution control after the switching, is output by sound (details are given below).

Next, a description is given of various function elements included in the control device 1.

The vehicle detection unit 10 is a function element for detecting another vehicle that is travelling in front of the vehicle (including a leading vehicle travelling in the same direction as the travelling direction of the self-vehicle, and an oncoming vehicle traveling in a direction opposite to the travelling direction of the self-vehicle, hereinafter, "front vehicle") based on output from the image sensor 2. For example, the vehicle detection unit 10 extracts a pixel having a brightness that is greater than or equal to a predetermined value, included in an image acquired by the image sensor 2 (hereinafter, "high brightness pixel"), and determines whether there is a front vehicle based on the location of the extracted high brightness pixel.

Specifically, the vehicle detection unit 10 determines whether there is a front vehicle based on whether there is a group of pixels (a collection of high brightness pixels of the red color system) corresponding to tail lamps of a leading vehicle. Preferably, the vehicle detection unit 10 detects the presence of a leading vehicle by detecting a pair of left and right tail lamps of a leading vehicle.

Furthermore, the vehicle detection unit 10 determines whether there is an oncoming vehicle based on whether there is a group of pixels (a collection of high brightness pixels of the white color system) corresponding to headlights of an oncoming vehicle. Preferably, the vehicle detection unit 10 detects the presence of an oncoming vehicle by detecting a pair of left and right headlights of an oncoming vehicle.

Furthermore, the vehicle detection unit 10 derives the inter-vehicular distance between the self-vehicle and one or more leading vehicles or oncoming vehicles, based on the distance between two groups of high brightness pixels (distance between tail lamps or distance between headlights) corresponding to a pair of left and right tail lamps of a leading vehicle or a pair of left and right headlights of an oncoming vehicle. Then, the vehicle detection unit 10 derives the minimum inter-vehicular distance among the inter-vehicular distances. As described above, the vehicle detection unit 10 derives the minimum inter-vehicular distance among the inter-vehicular distances between the self-vehicle and one or more front vehicles including leading vehicles and oncoming vehicles.

The vehicle detection unit 10 may use a distance measuring device (not shown) such as a laser radar sensor, a millimeter wave sensor, or an ultrasound sensor, to detect the inter-vehicular distance between the self-vehicle and a front vehicle.

The light distribution control unit 11 is a function element for controlling the light distribution pattern of the headlights 3. For example, the light distribution control unit 11 generates desired light distribution patterns by outputting control signals to the shade driving device 4.

Specifically, when the vehicle detection unit 10 detects a leading vehicle, the light distribution control unit 11 outputs control signals to the shade driving device 4, and generates, by basically using a high beam pattern, a light distribution pattern (hereinafter, a "leading vehicle following time pattern") such that light of the headlights 3 is not radiated to the leading vehicle so that the driver of the leading vehicle is not dazzled. Furthermore, when the vehicle detection unit 10 detects an oncoming vehicle, the light distribution control unit 11 generates, by basically using a high beam pattern, a light distribution pattern (hereinafter, a "oncoming vehicle approaching time pattern") such that light of the headlights 3 is not radiated to the oncoming vehicle so that the driver of the oncoming vehicle is not dazzled. In the following, the leading vehicle following time pattern and the oncoming vehicle approaching time pattern are collectively referred to as a "front vehicle-use pattern".

Figure 3A:
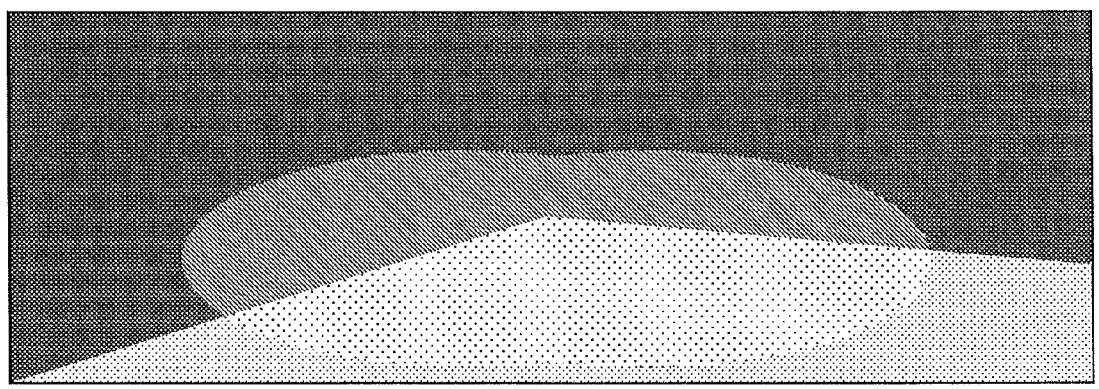
FIG. 3A illustrates an example of a light distribution pattern in a case where it is determined that there is no front vehicle.
Figure 3B:
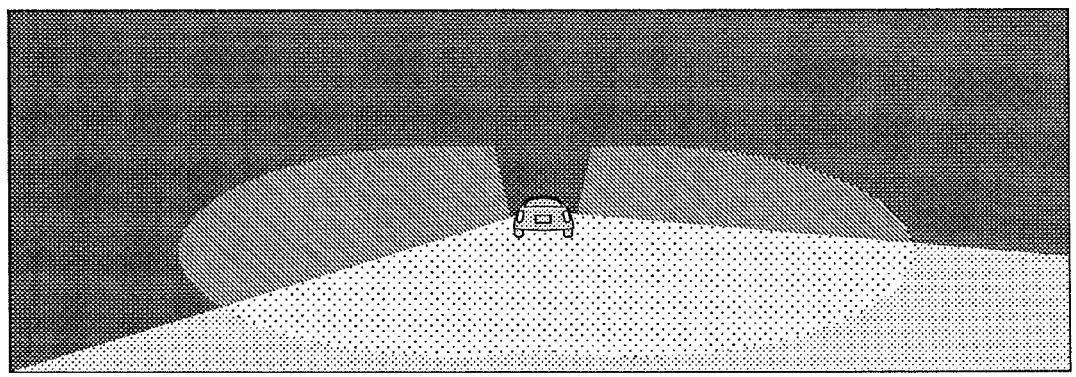
FIG. 3B illustrates an example of a light distribution pattern in a case where it is determined that there is a front vehicle that is relatively far away in front of the self-vehicle.
Figure 3C:
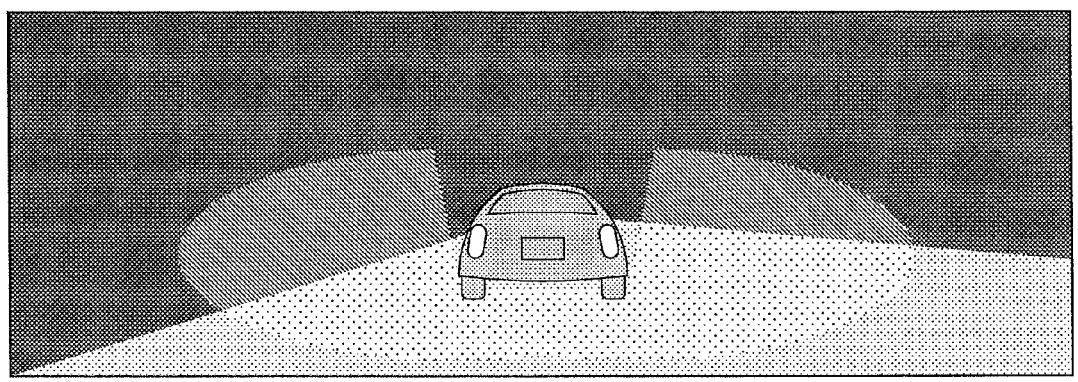
FIG. 3C illustrates an example of a light distribution pattern in a case where it is determined that there is a front vehicle that is relatively close in front of the self-vehicle.

FIGS. 3A through 3C illustrate examples of light distribution patterns generated by the light distribution control unit 11. FIG. 3A illustrates a high beam pattern in a case where it is determined that there is no front vehicle in front of the self-vehicle. FIG. 3B illustrates a front vehicle-use pattern (in the present embodiment, a leading vehicle following time pattern) in a case where it is determined that there is a front vehicle (in the present embodiment, a leading vehicle) that is relatively far away in front of the self-vehicle. FIG. 3C illustrates a front vehicle-use pattern (a leading vehicle following time pattern) in a case where it is determined that there is a front vehicle (leading vehicle) that is relatively close in front of the self-vehicle.

Furthermore, when the minimum inter-vehicular distance (the inter-vehicular distance between the self-vehicle and the front vehicle closest to the self-vehicle) derived by the vehicle detection unit 10 is less than a predetermined light distribution control upper limit distance (for example, one kilometer), the light distribution control unit 11 allows the usage of a leading vehicle following time pattern or an oncoming vehicle approaching time pattern. When the minimum inter-vehicular distance is greater than or equal to a predetermined light distribution control upper limit distance, the light distribution control unit 11 prohibits the usage of a leading vehicle following time pattern or an oncoming vehicle approaching time pattern. This is because when the minimum inter-vehicular distance exceeds the light distribution control upper limit distance, the detection of a front vehicle may become impossible or inaccurate.

The detection difficulty determining unit 12 is a function element for determining the difficulty in detecting a front vehicle by the vehicle detection unit 10. For example, the difficulty of detection is determined based on the environment surrounding the self-vehicle (for example, whether the self-vehicle is travelling in an environment (for example, an urban district) has a light source that is difficult to be distinguished from the tail lamps of a leading vehicle or headlights of an oncoming vehicle in the image output by the image sensor 2).

Specifically, when the number of high brightness pixel groups included in a predetermined area of the image acquired by the image sensor 2 is greater than or equal to a predetermined value (for example, a value "3"), the detection difficulty determining unit 12 determines that a light source other than light sources relevant to a front vehicle may be erroneously recognized as a light source relevant to a front vehicle and accurate detection of a front vehicle becomes difficult. Meanwhile, when the number of high brightness pixel groups included in a predetermined area of the image acquired by the image sensor 2 is less than a predetermined value, the detection difficulty determining unit 12 determines that it is relatively unlikely that a light source other than light sources relevant to a front vehicle is erroneously recognized as a light source relevant to a front vehicle, and accurate detection of a front vehicle becomes easy.

Furthermore, the detection difficulty determining unit 12 may not only determine whether accurate detection of a front vehicle is difficult based on a choice between only two things, but may determine the difficulty in the detection of a front vehicle by multiple stages according to the number of high brightness pixel groups. In this case, for example, the detection difficulty determining unit 12 increases the difficulty as the number of high brightness pixel groups increases.

Furthermore, the detection difficulty determining unit 12 may determine the difficulty of detecting a front vehicle by the vehicle detection unit 10, based on the environment surrounding the self-vehicle specified by using a positioning device (not shown) such as GPS (Global Positioning System) and map data. In this case, for example, the detection difficulty determining unit 12 determines that detection is more difficult when the self-vehicle is travelling in an urban district than when the self-vehicle is travelling in the suburbs.

The light distribution control state display unit 13 is a function element for displaying the present state of light distribution control on the display device 5. For example, the light distribution control state display unit 13 displays the operational conditions of light distribution control that is presently executed so that the driver can recognize the operational conditions.

Furthermore, in addition to the present state of light distribution control, the light distribution control state display unit 13 displays the detection state of a front vehicle by the vehicle detection unit 10 on the display device 5.

Figure 4A:
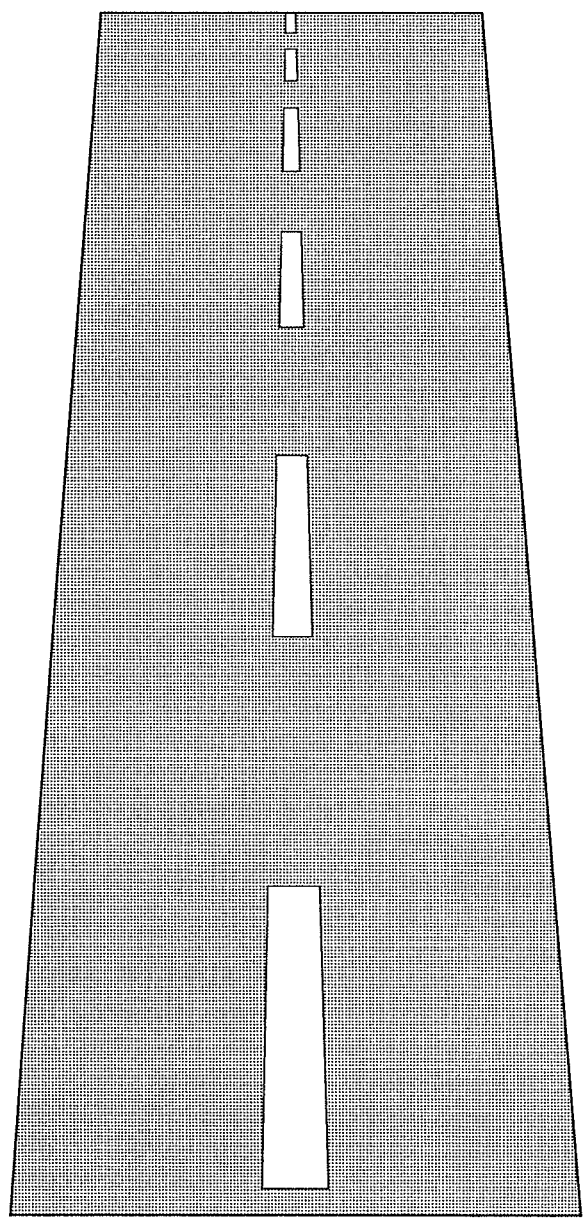
FIG. 4A is a display example of an indicator expressing the present state of light distribution control (state of FIG. 3A).
Figure 4B:
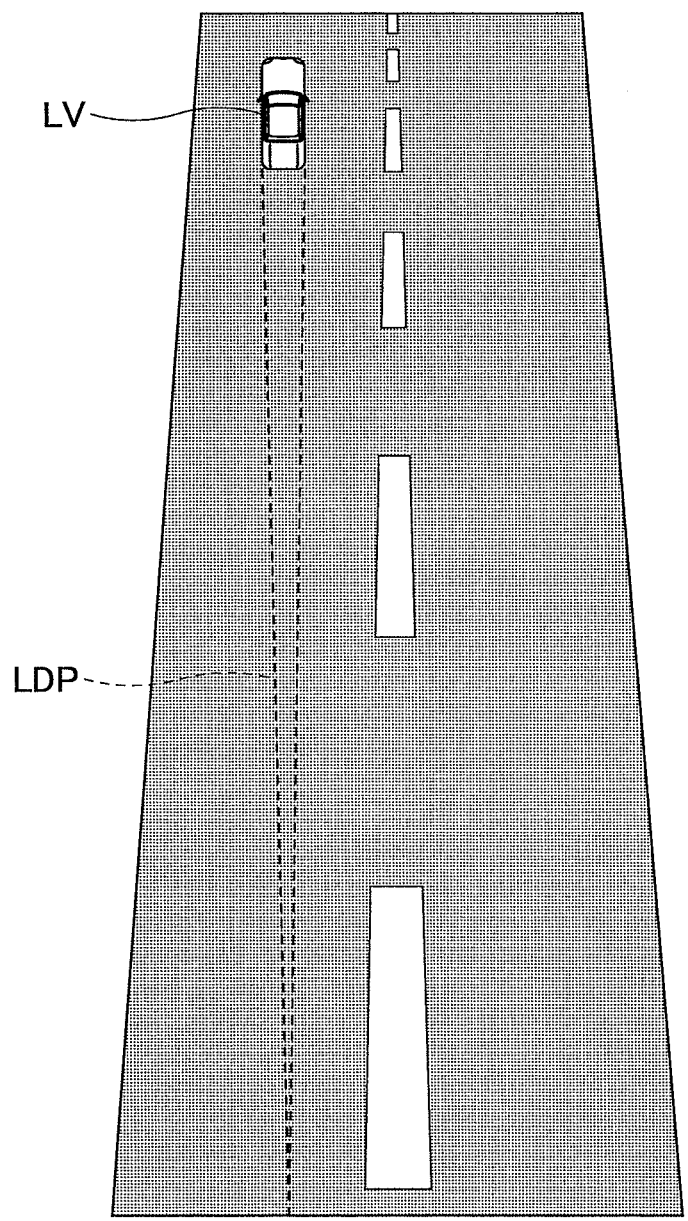
FIG. 4B is a display example of an indicator expressing the present state of light distribution control (state of FIG. 3B).
Figure 4C:
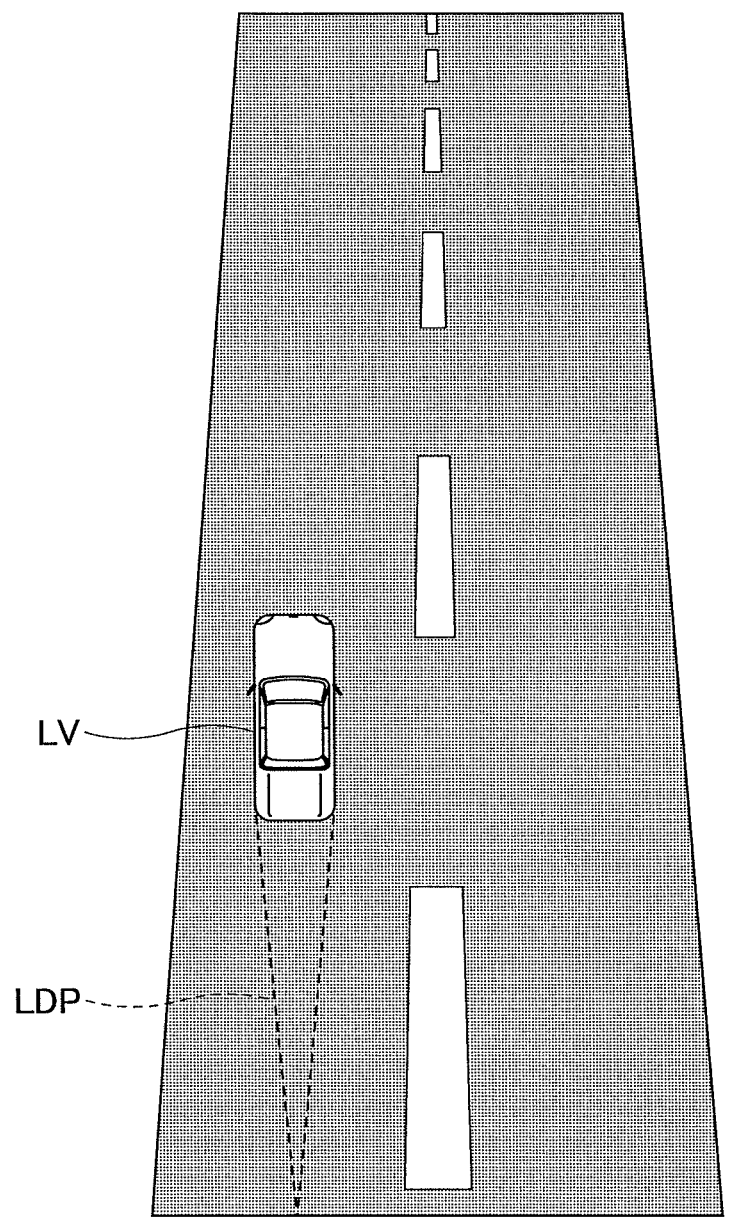
FIG. 4C is a display example of an indicator expressing the present state of light distribution control (state of FIG. 3C).

FIGS. 4A through 4C illustrate display examples of indicators expressing the present state of light distribution control displayed on the display device 5 by the light distribution control state display unit 13.

FIG. 4A illustrates an indicator for a state of light distribution control in a case where the detection difficulty determining unit 12 has determined that it is easy for the vehicle detection unit 10 to detect a front vehicle and there is no front vehicle in front of the self-vehicle (the case of FIG. 3A) (hereinafter, "first light distribution control state"). FIG. 4A represents a case where a high beam pattern is used by not displaying a light distribution pattern image in the figure. Furthermore, the indicator for the first light distribution control state may be represented by a different color, so that the traffic lane along which the self-vehicle is travelling is distinguishable from other traffic lanes (including an oncoming traffic lane). The same applies to indicators for other light distribution control states.

Furthermore, FIG. 4B illustrates an indicator for a state of light distribution control in a case where the detection difficulty determining unit 12 has determined that it is easy for the vehicle detection unit 10 to detect a front vehicle and there is a front vehicle (leading vehicle) LV in front of the self-vehicle (the case of FIG. 3B) (hereinafter, "second light distribution control state"). A light distribution pattern image LDP in FIG. 4B represents a state where a front vehicle-use pattern (leading vehicle following time pattern) is used.

Furthermore, FIG. 4C illustrates an indicator for a second light distribution control state in a case where the detection difficulty determining unit 12 has determined that it is easy for the vehicle detection unit 10 to detect a front vehicle and there is a front vehicle (leading vehicle) LV in front of the self-vehicle (the case of FIG. 3C). The indicator of FIG. 4C is the same as that of FIG. 4B, except that the inter-vehicular distance between the self-vehicle and a front vehicle (leading vehicle) LV is less than the case of FIG. 4B.

In FIGS. 4B and 4C, the light distribution control state display unit 13 displays a leading vehicle LV travelling in the same direction as the travelling direction of the self-vehicle along the left traffic lane. However, when there is an oncoming vehicle travelling in a direction opposite to the travelling direction of the self-vehicle, the oncoming vehicle is displayed along the right traffic lane.

The operational condition changing unit 14 is a function element for changing the operational conditions of light distribution control. For example, the operational condition changing unit 14 changes the operational conditions of light distribution control according to the determination result of the detection difficulty determining unit 12.

Specifically, when the detection difficulty determining unit 12 determines that it is difficult for the vehicle detection unit 10 to accurately detect a front vehicle, the operational condition changing unit 14 reduces the light distribution control upper limit distance, which is one of the operational conditions of light distribution control, from the maximum distance (an upper limit distance at which a front vehicle can be detected based on an image output from the image sensor 2, such as one kilometer) to a predetermined detection-difficult-time distance (for example, 200 meters).

Furthermore, the operational condition changing unit 14 may not only switch the light distribution control upper limit distance between the maximum value and the detection-difficult-time distance based on a choice between only two things, but may adjust the light distribution control upper limit distance in a stepwise manner according to the difficulty in detecting a front vehicle determined by the detection difficulty determining unit 12.

Specifically, the operational condition changing unit 14 reduces the light distribution control upper limit distance as the difficulty in detecting a front vehicle increases (the more difficult it is to accurately detect a front vehicle). Meanwhile, the operational condition changing unit 14 increases the light distribution control upper limit distance as the difficulty in detecting a front vehicle decreases (the easier it is to accurately detect a front vehicle).

Figure 5:
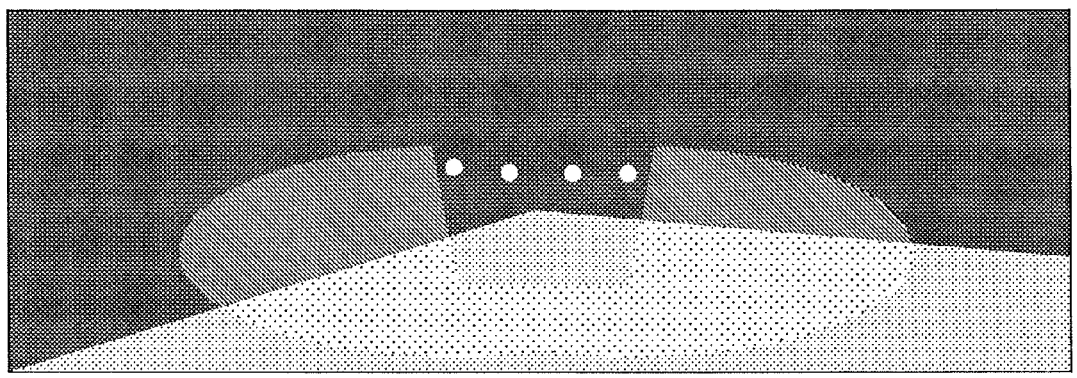
FIG. 5 illustrates an example of a light distribution pattern in a case where the light distribution control upper limit distance is not adjusted.

FIG. 5 illustrates another example of a light distribution pattern controlled by the light distribution control unit 11. This is an example of a light distribution pattern in a case where even when it is determined by the detection difficulty determining unit 12 that it is difficult to accurately detect a front vehicle, the operational condition changing unit 14 has not adjusted the light distribution control upper limit distance (the light distribution control upper limit distance remains at a maximum distance).

In this case, the vehicle detection unit 10 erroneously recognizes that a light source relevant to traffic lights or warning lights of a railroad crossing located at a distance exceeding a detection-difficult-time distance from the self-vehicle, is a light source relevant to tail lamps of a leading vehicle or headlights of an oncoming vehicle. Therefore, light distribution control is executed with the use of a front vehicle-use pattern even though there is no front vehicle.

Figure 6A:
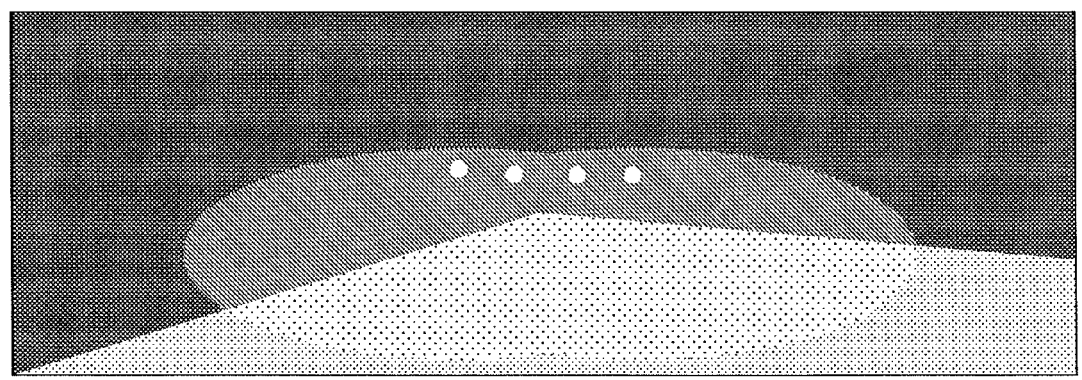
FIG. 6A illustrates an example of a light distribution pattern in a case where the light distribution control upper limit distance has been adjusted and it is determined that there is no front vehicle.
Figure 6B:
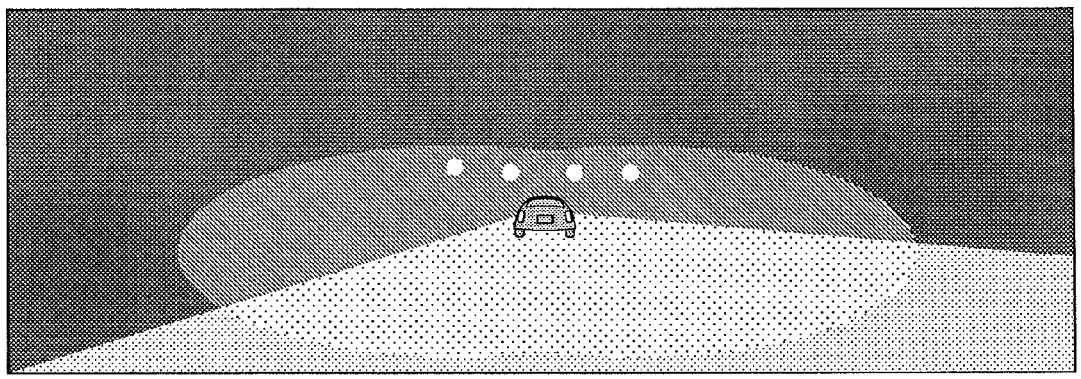
FIG. 6B illustrates an example of a light distribution pattern in a case where the light distribution control upper limit distance has been adjusted and it is determined that there is a front vehicle further away than the light distribution control upper limit distance.
Figure 6C:
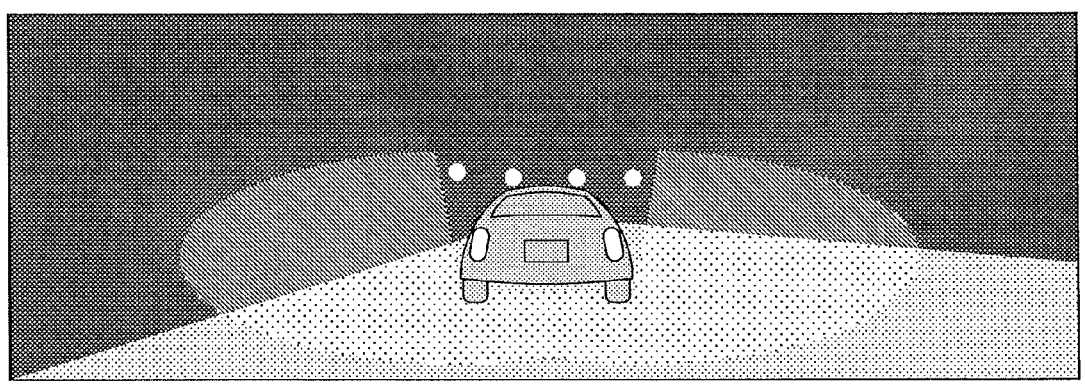
FIG. 6C illustrates an example of a light distribution pattern in a case where the light distribution control upper limit distance has been adjusted and it is determined that there is a front vehicle within the light distribution control upper limit distance.

Meanwhile, FIGS. 6A through 6C illustrate examples of light distribution patterns in a case where the detection difficulty determining unit 12 has determined that it is difficult for the vehicle detection unit 10 to accurately detect a front vehicle, and the operational condition changing unit 14 has adjusted the light distribution control upper limit distance.

FIG. 6A illustrates a high beam pattern used in a case where it is determined that there is no front vehicle in front of the self-vehicle. This control is the same as the case where the detection difficulty determining unit 12 has determined that it is easy for the vehicle detection unit 10 to accurately detect a front vehicle (the case of FIG. 3A).

FIG. 6B illustrates a high beam pattern used in a case where it is determined that there is a front vehicle (leading vehicle) further away than the light distribution control upper limit distance after adjustment in front of the self-vehicle (actually, a case where it cannot be accurately determined whether there is a front vehicle (leading vehicle)). This control is different from the case of using a front vehicle-use pattern when the detection difficulty determining unit 12 has determined that it is easy for the vehicle detection unit 10 to accurately detect a front vehicle (the case of FIG. 3B). In this case, it is possible to prevent the light distribution of the headlights 3 from being excessively restricted because a front vehicle cannot be accurately determined.

FIG. 6C illustrates a front vehicle-use pattern (leading vehicle following time pattern) used in a case where it is determined that there is a front vehicle (leading vehicle) within the light distribution control upper limit distance in front of the self-vehicle. This control is the same as the case where the detection difficulty determining unit 12 has determined that it is easy for the vehicle detection unit 10 to accurately detect a front vehicle (the case of FIG. 3C).

Figure 7A:
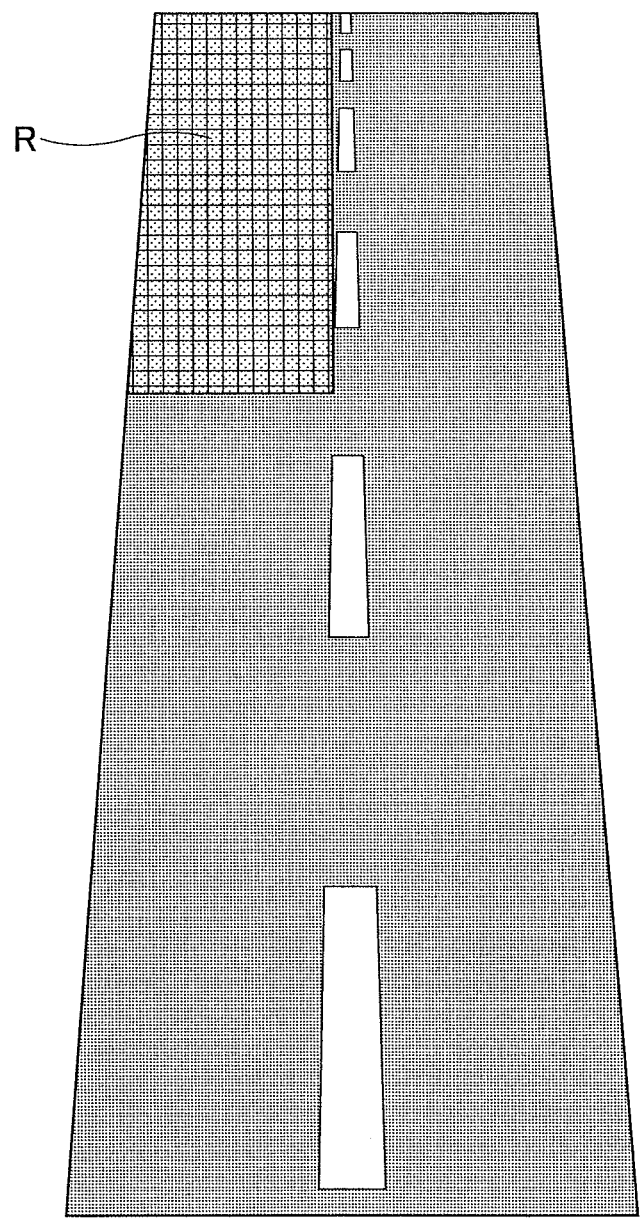
FIG. 7A is a display example of an indicator expressing the present state of light distribution control (state of FIG. 6A).
Figure 7B:
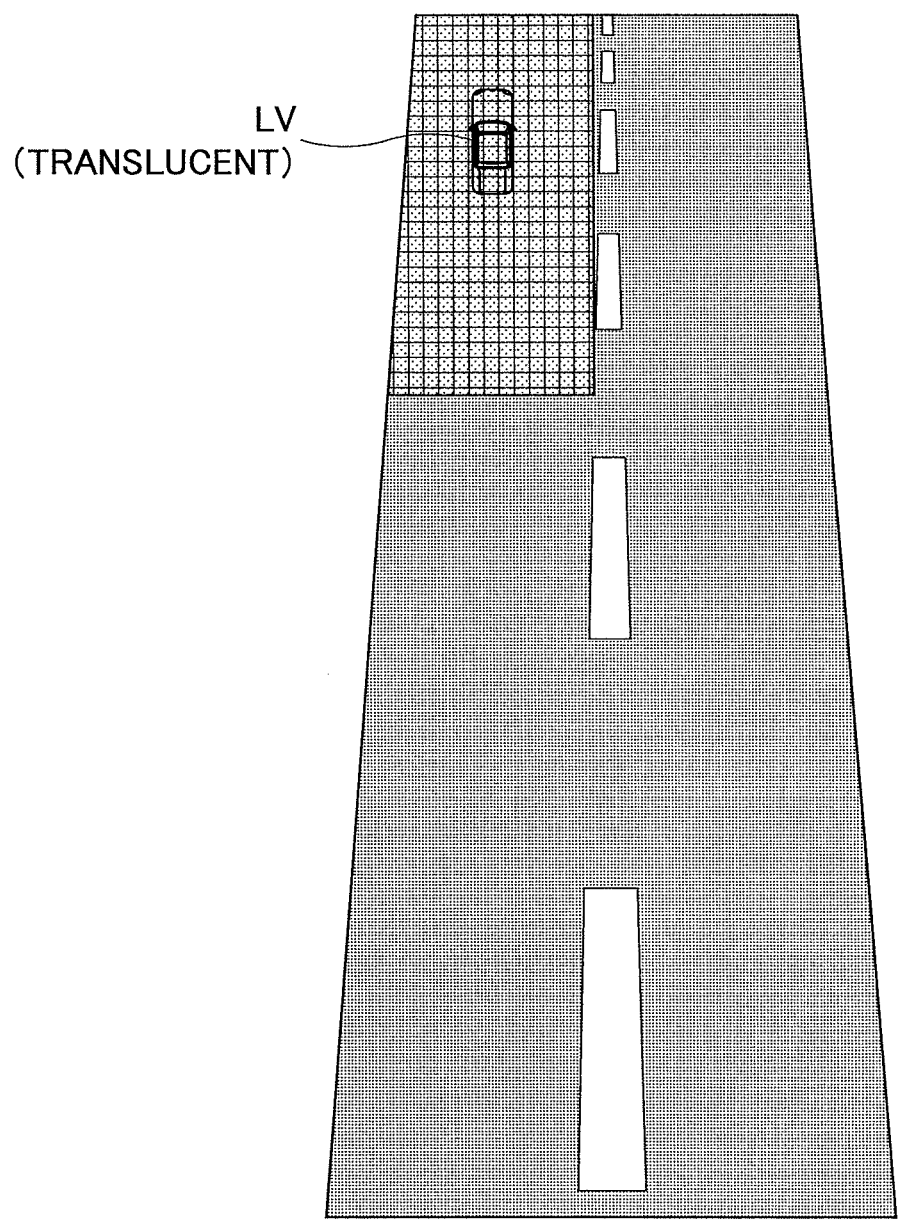
FIG. 7B is a display example of an indicator expressing the present state of light distribution control (state of FIG. 6B).
Figure 7C:
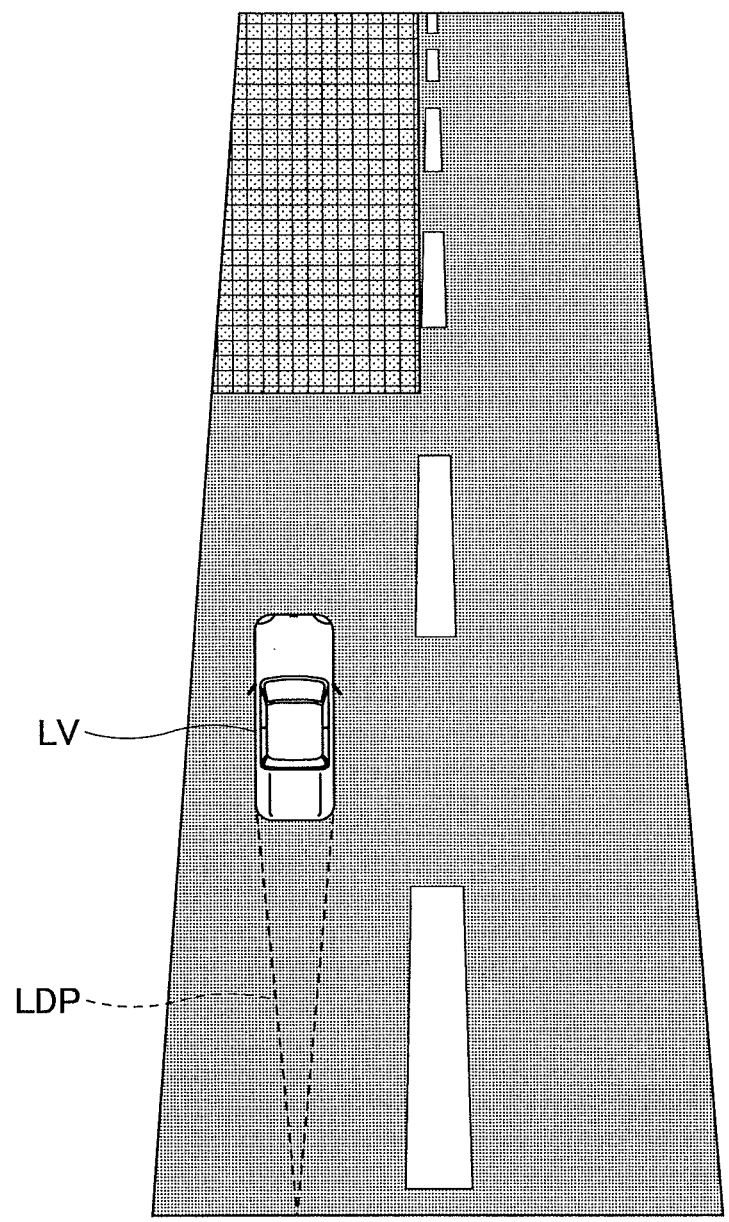
FIG. 7C is a display example of an indicator expressing the present state of light distribution control (state of FIG. 6C).

FIGS. 7A through 7C illustrate display examples of indicators for the present state of light distribution control displayed on the display device 5 by the light distribution control state display unit 13, in a case where the detection difficulty determining unit 12 has determined that it is difficult for the vehicle detection unit 10 to accurately detect a front vehicle and the operational condition changing unit 14 has adjusted the light distribution control upper limit distance.

FIG. 7A illustrates an indicator for the state of light distribution control (hereinafter, "third light distribution control state") in a case where the detection difficulty determining unit 12 has determined that it is difficult for the vehicle detection unit 10 to detect a front vehicle and there is no front vehicle in front of the self-vehicle (the case of FIG. 6A). The hatched area R in FIG. 7A represents an area that is further away than the light distribution control upper limit distance that is reduced by the operational condition changing unit 14 (hereinafter, "light distribution control inapplicable area"). For example, this area is greater than or equal to 200 meters and less than one kilometer from the self-vehicle, and this area is where it cannot be accurately determined whether there is a front vehicle (leading vehicle). Furthermore, FIG. 7A is the same as FIG. 4A in that a state where a high beam pattern is used is represented by not displaying a light distribution pattern image in the figure.

FIG. 7B illustrates an indicator for a state of light distribution control (hereinafter, "fourth light distribution control state") in a case where the detection difficulty determining unit 12 has determined that it is difficult for the vehicle detection unit 10 to detect a front vehicle and there is a front vehicle (leading vehicle) that is further away than the light distribution control upper limit distance after being adjusted in front of the self-vehicle (the case of FIG. 6B and actually it cannot be accurately determined whether there is a front vehicle (leading vehicle)). The hatched area R in FIG. 7B represents a light distribution control inapplicable area. Furthermore, FIG. 7B is the same as FIG. 4A and FIG. 7A in that a state where a high beam pattern is used is represented by not displaying a light distribution pattern image in the figure.

Furthermore, in FIG. 7B, the light distribution control state display unit 13 is displaying, in a translucent state, a front vehicle (leading vehicle) LV that is detected by the vehicle detection unit 10 but cannot be accurately determined whether it is actually there. However, such a front vehicle (leading vehicle) LV may not be displayed.

FIG. 7C illustrates an indicator for a state of light distribution control (hereinafter, "fifth light distribution control state") in a case where the detection difficulty determining unit 12 has determined that it is difficult for the vehicle detection unit 10 to detect a front vehicle and there is a front vehicle (leading vehicle) LV that is within the light distribution control upper limit distance after being adjusted in front of the self-vehicle (the case of FIG. 6C). The hatched area R in FIG. 7C represents a light distribution control inapplicable area, and a light distribution pattern image LDP in FIG. 7C represents a state where a front vehicle-use pattern (leading vehicle following time pattern) is applied.

Figure 8:
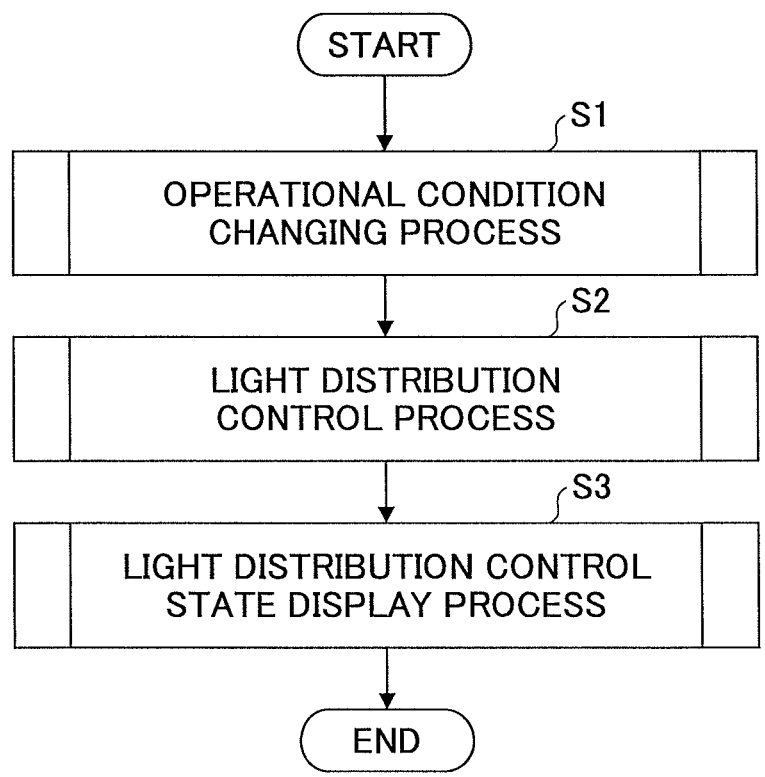
FIG. 8 is a flowchart indicating the flow of a process by the on-vehicle light distribution control system.

Next, with reference to FIG. 8, a description is given of operation procedures of the on-vehicle light distribution control system 100. FIG. 8 is a flowchart indicating the flow of a process by the on-vehicle light distribution control system 100, and it is assumed that the on-vehicle light distribution control system 100 repeatedly executes this process at predetermined periods while the headlights 3 are on and the system is operating.

The operation procedures of the on-vehicle light distribution control system 100 are mainly constituted by a process of changing the operational conditions of light distribution control according to the difficulty in detecting a front vehicle (hereinafter, "operational condition changing process"), a process of controlling a light distribution pattern of the headlights 3 according to the changed operational conditions and a detection result of a front vehicle (hereinafter, "light distribution control process"), and a process of displaying an indicator expressing the present state of light distribution control on the display device 5 (hereinafter, "light distribution control state display process").

Figure 9:
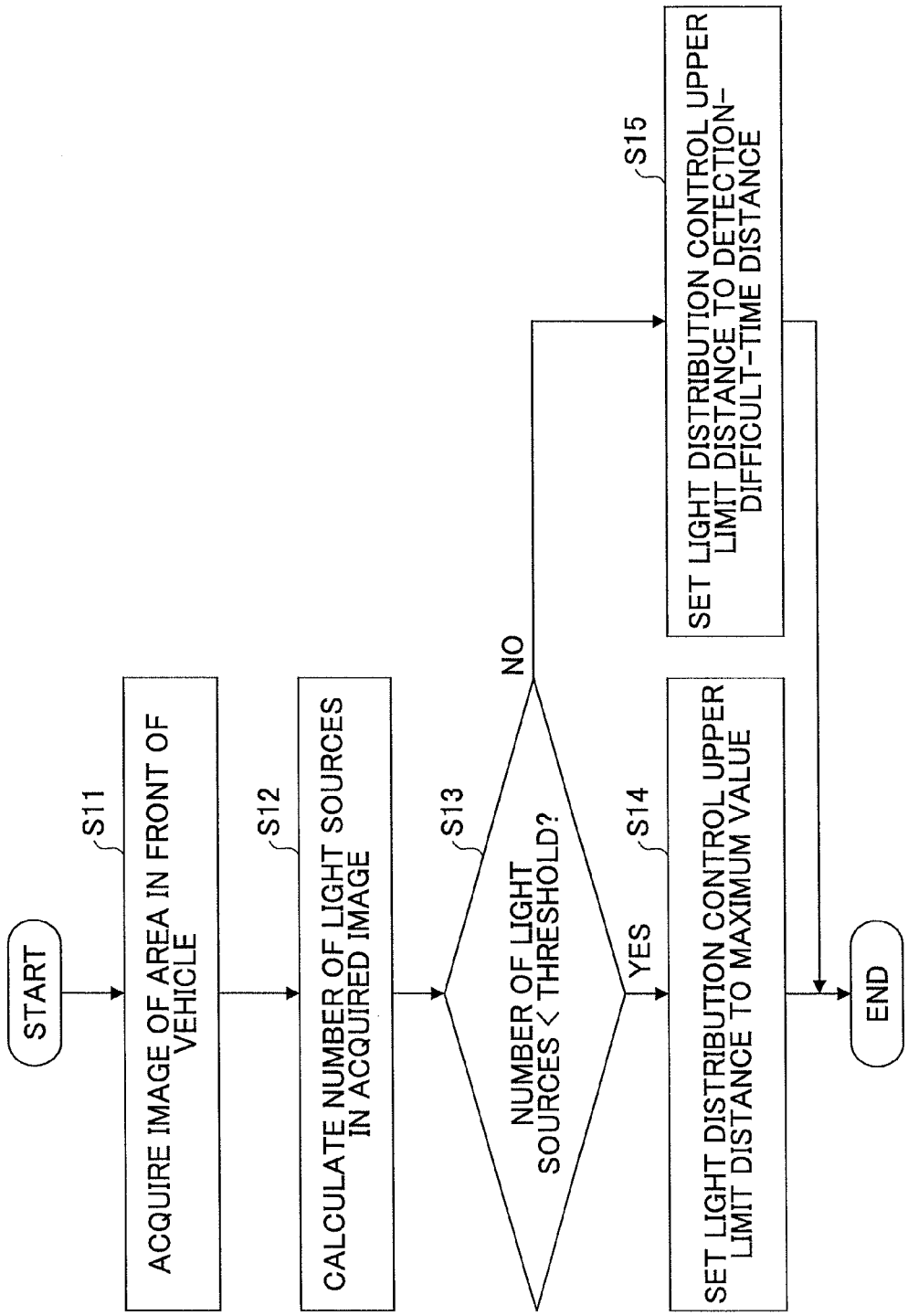
FIG. 9 is a flowchart indicating the flow of an operational condition changing process.

First, with reference to FIG. 9, a description is given of the flow of the operational condition changing process.

First, the control device 1 acquires, by the detection difficulty determining unit 12, an image of an area in front of the self-vehicle that has been taken by the image sensor 2 (step S11), and calculates the number of light sources (high brightness pixel groups) in the acquired image (step S12). In this case, the control device 1 calculates, as one count, each of the two light sources corresponding to the pair of left and right tail lamps of a leading vehicle or the pair of left and right headlights of an oncoming vehicle. However, the two light sources corresponding to the pair of left and right tail lamps of a leading vehicle or the pair of left and right headlights of an oncoming vehicle may be collectively calculated as one count.

Subsequently, the control device 1 compares, by the detection difficulty determining unit 12, the number of calculated light sources with a predetermined threshold (for example, a value "3" in a case of calculating, as one count, each of the two light sources corresponding to the pair of left and right tail lamps of a leading vehicle or the pair of left and right headlights of an oncoming vehicle, or a value "2" in a case of collectively calculating, as one count, the two light sources corresponding to the pair of left and right tail lamps of a leading vehicle or the pair of left and right headlights of an oncoming vehicle) (step S13). When the control device 1 determines that the number of light sources is less than a threshold (YES in step S13), the control device 1 sets, by the operational condition changing unit 14, the light distribution control upper limit distance to a maximum value (for example, one kilometer) (step S14).

Meanwhile, when the control device 1 determines that the number of light sources is greater than or equal to a threshold (NO in step S13), the control device 1 sets, by the operational condition changing unit 14, the light distribution control upper limit distance to a predetermined detection-difficult-time distance (for example, 200 meters) (step S15).

As described above, the on-vehicle light distribution control system 100 can change the operational conditions of light distribution control according to the difficulty of detecting a front vehicle.

Figure 10:
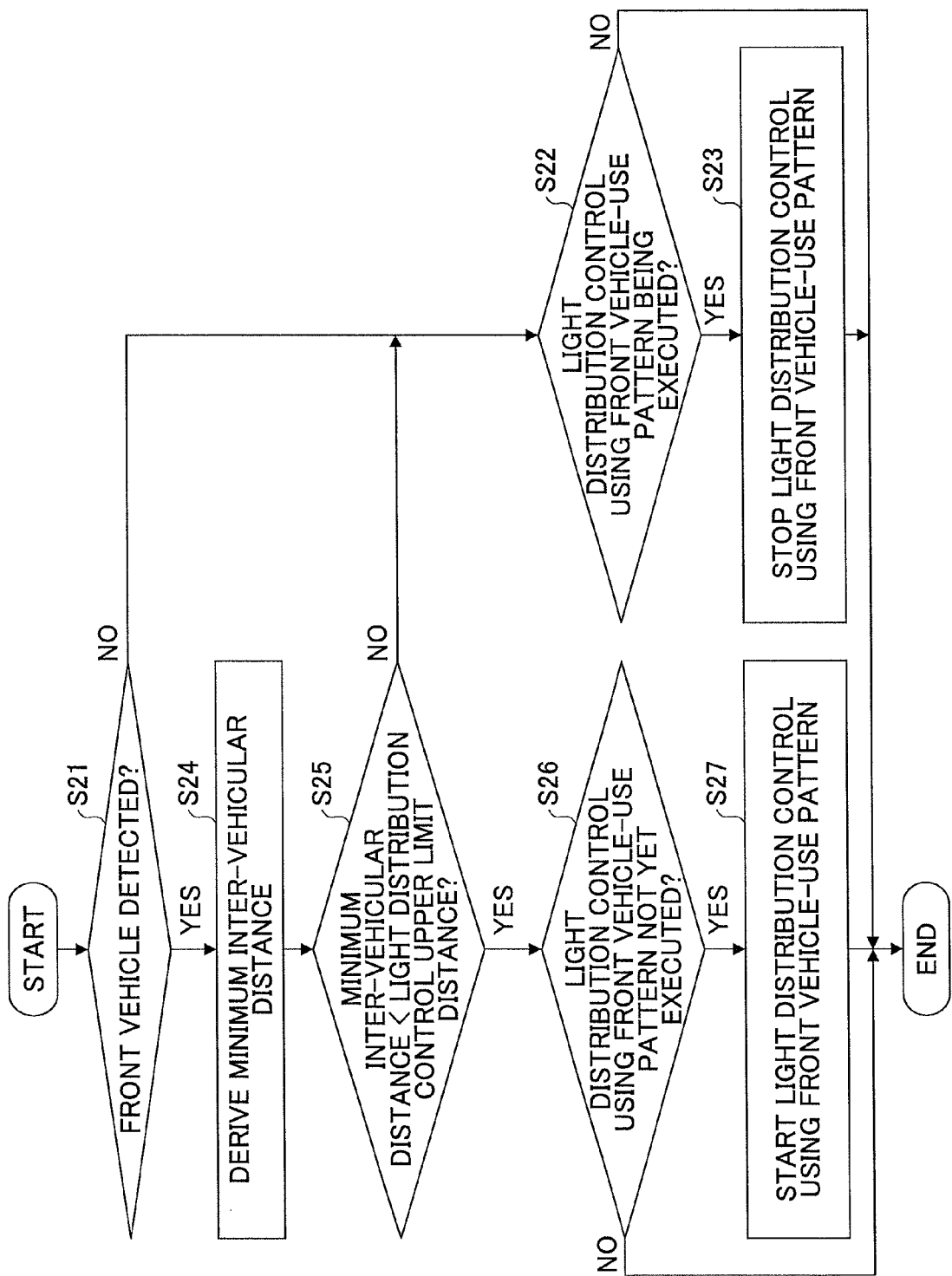
FIG. 10 is a flowchart indicating the flow of a light distribution control process.

Next, with reference to FIG. 10, a description is given of the flow of a light distribution control process.

First, the control device 1 determines, by the vehicle detection unit 10, whether there is a front vehicle in the image output by the image sensor 2 (step S21).

When the control device 1 determines there is no front vehicle (NO in step S21), the control device 1 determines whether the light distribution control unit 11 has already executed light distribution control using a front vehicle-use pattern (step S22).

When the control device 1 determines that light distribution control using a front vehicle-use pattern has already been executed (YES in step S22), the control device 1 stops, by the light distribution control unit 11, the light distribution control using the front vehicle-use pattern (step S23), and executes light distribution control using a high beam pattern.

Furthermore, when the control device 1 determines that light distribution control using a front vehicle-use pattern has not been executed (NO in step S22), the control device 1 ends the present light distribution control process without starting light distribution control using the front vehicle-use pattern.

Meanwhile, when the control device 1 determines there is a front vehicle (YES in step S21), the control device 1 derives the minimum inter-vehicular distance by the vehicle detection unit 10 (step S24), and compares the minimum inter-vehicular distance with the light distribution control upper limit distance set in the above operational condition changing process (step S25).

When the control device 1 determines that the minimum inter-vehicular distance is greater than or equal to the light distribution control upper limit distance (NO in step S25), the control device 1 determines whether the light distribution control unit 11 has already executed light distribution control using a front vehicle-use pattern (step S22), and when the control device 1 determines that light distribution control using a front vehicle-use pattern has already been executed (YES in step S22), the control device 1 stops the light distribution control using the front vehicle-use pattern (step S23).

When the control device 1 determines that the minimum inter-vehicular distance is less than the light distribution control upper limit distance (YES in step S25), the control device 1 determines whether light distribution control using the front vehicle-use pattern by the light distribution control unit 11 is not yet executed (step S26).

When the control device 1 determines that light distribution control using the front vehicle-use pattern is not yet executed (YES in step S26), the control device 1 starts, by the light distribution control unit 11, light distribution control using the front vehicle-use pattern (step S27).

Furthermore, when the control device 1 determines that light distribution control using the front vehicle-use pattern has already been executed (NO in step S26), the control device 1 continues the light distribution control using the front vehicle-use pattern without stopping the light distribution control using the front vehicle-use pattern, and ends the present light distribution control process.

As described above, the on-vehicle light distribution control system 100 can control the light distribution pattern of the headlights 3 according to the light distribution control upper limit distance changed according to the difficulty of detecting a front vehicle and the detection result of a front vehicle.

Figure 11:
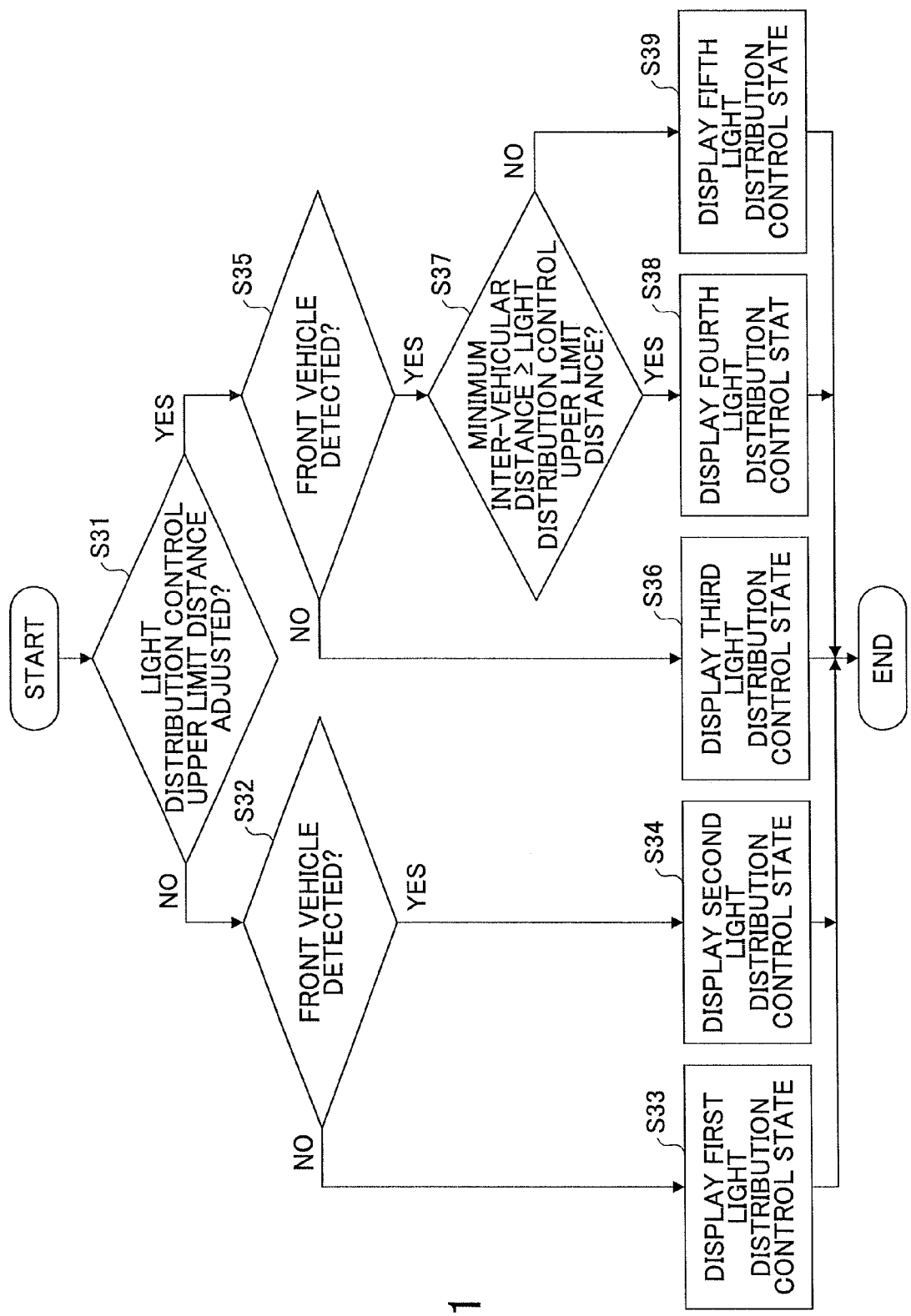
FIG. 11 is a flowchart indicating the flow of a light distribution control state display process.

Next, with reference to FIG. 11, a description is given of the flow of the light distribution control state display process.

First, the control device 1 determines, by the operational condition changing unit 14, whether the light distribution control upper limit distance has been adjusted (whether the light distribution control upper limit distance has been set to a distance other than a maximum value in the above operational condition changing process) (step S31).

When the control device 1 determines that the light distribution control upper limit distance has not been adjusted and remains as the maximum value (NO in step S31), the control device 1 determines whether a front vehicle has been detected by the vehicle detection unit 10 (step S32). When the control device 1 determines that a front vehicle has not been detected (NO in step S32), the control device 1 causes the display device 5 to display an indicator expressing the first light distribution control state (FIG. 4A) (step S33). When the control device 1 determines that a front vehicle has been detected (YES in step S32), the control device 1 causes the display device 5 to display an indicator expressing the second light distribution control state (FIG. 4B or 4C) (step S34).

Meanwhile, when the control device 1 determines that the light distribution control upper limit distance has been adjusted and a detection-difficult-time distance is set instead of the maximum value (YES in step S31), the control device 1 determines whether a front vehicle has been detected by the vehicle detection unit 10 (step S35). When a front vehicle has not been detected (NO in step S35), the control device 1 causes the display device 5 to display an indicator representing the third light distribution control state (FIG. 7A) (step S36).

When the control device 1 determines that a front vehicle has been detected (YES in step S35), the control device 1 determines whether the minimum inter-vehicular distance derived in the above light distribution control process is greater than or equal to the light distribution control upper limit distance set in the above operational condition changing process (step S37). When the control device 1 determines that the minimum inter-vehicular distance is greater than or equal to the light distribution control upper limit distance (YES in step S37), the control device 1 causes the display device 5 to display an indicator representing the fourth light distribution control state (FIG. 7B) (step S38). When the control device 1 determines that the minimum inter-vehicular distance is less than the light distribution control upper limit distance (NO in step S37), the control device 1 causes the display device 5 to display an indicator representing the fifth light distribution control state (FIG. 7C) (step S39).

When the control device 1 causes the display device 5 to display an indicator representing the third through fifth light distribution control states, the control device 1 may output a control signal to the sound output device 6, so that a sound is output indicating that the light distribution control upper limit distance has been adjusted to the detection-difficult-time distance and that the detection-difficult-time distance is 200 meters.

As described above, the on-vehicle light distribution control system 100 can display, on the display device 5, an indicator representing the present state of light distribution control.

By the above configuration, the on-vehicle light distribution control system 100 presents, to the driver, the present state of light distribution control of the headlights 3 for which the operational conditions are changed according to the difficulty in detecting another vehicle. Accordingly, the driver can easily recognize the present state of light distribution control.

Furthermore, the on-vehicle light distribution control system 100 displays the light distribution control inapplicable area so as to be distinguishable from other areas, and therefore the driver can easily recognize that the light distribution control upper limit distance has been adjusted (reduced) according to the environment surrounding the self-vehicle (for example, the difficulty in detecting another vehicle).

The preferred embodiments of the present invention are described above in detail. The present invention is not limited to the specific embodiments described herein, and variations and modifications may be made in the above embodiments without departing from the scope of the present invention.

For example, in the above embodiments, the detection difficulty determining unit 12 may determine the difficulty of detecting a front vehicle by the vehicle detection unit 10, based on output of an illuminance sensor (not shown). In this case, for example, the detection difficulty determining unit 12 determines that the detection is more difficult in a case where the area surrounding the self-vehicle is gloomy (the tail lamps of a leading vehicle or the headlights of an oncoming vehicle do not stand out) than in a case where the area surrounding the self-vehicle is dark (the tail lamps of a leading vehicle or the headlights of an oncoming vehicle stand out).

Furthermore, the detection difficulty determining unit 12 may determine the difficulty in detecting a front vehicle by the vehicle detection unit 10 based on output from a raindrop sensor or wipers. In this case, for example, the detection difficulty determining unit 12 determines that the amount of rainfall has increased as the raindrop amount increases or as the operation speed of the wiper increases, and increases the difficulty of detection.

DESCRIPTION OF REFERENCE SYMBOLS

1 control device
2 image sensor
3 headlights
4 shade driving device
5 display device
6 sound output device
10 vehicle detection unit
11 light distribution control unit
12 detection difficulty determining unit
13 light distribution control state display unit
14 operation condition changing unit
100 on-vehicle light distribution control system

The invention claimed is:
1. An on-vehicle light distribution control system for controlling light distribution of headlights, the on-vehicle light distribution control system comprising:

a vehicle detecting unit configured to detect a front vehicle travelling in front of a self-vehicle;
a detection difficulty determining unit configured to determine difficulty of the detection of the front vehicle by the vehicle detecting unit within a detection range of the vehicle detecting unit;
an operational condition changing unit configured to change an operational condition of light distribution control according to a determination result of the detection difficulty determining unit; and
a light distribution control state display unit configured to display a present state of the light distribution control for which the operational condition is changed by the operational condition changing unit,
wherein the operational condition changing unit reduces a light distribution control upper limit distance as the difficulty in detecting a front vehicle increases, and increases the light distribution control upper limit distance as the difficulty in detecting a front vehicle decreases.

2. The on-vehicle light distribution control system according to claim 1, wherein
the detection difficulty determining unit determines the difficulty of the detection of the front vehicle by the vehicle detecting unit based on an environment surrounding the self-vehicle.

3. An on-vehicle light distribution control system for controlling light distribution of headlights, the on-vehicle light distribution control system comprising:
a vehicle detecting unit configured to detect a front vehicle travelling in front of a self-vehicle;
a detection difficulty determining unit configured to determine difficulty of the detection of the front vehicle by the vehicle detecting unit;
an operational condition changing unit configured to change an operational condition of light distribution control according to a determination result of the detection difficulty determining unit; and
a light distribution control state display unit configured to display a present state of the light distribution control for which the operational condition is changed by the operational condition changing unit, wherein
the on-vehicle light distribution control system operates the light distribution control when a distance between the self-vehicle and the front vehicle is less than or equal to a predetermined distance,
the vehicle detecting unit detects the front vehicle by using an image output by an image sensor that takes images of an area in front of the self-vehicle,
the detection difficulty determining unit determines that the detection by the vehicle detecting unit is difficult when a number of light sources in the image output by the image sensor is greater than or equal to a predetermined value, and
the operational condition changing unit reduces the predetermined distance when the detection by the vehicle detecting unit is determined as being difficult, and
the operational condition changing unit reduces a light distribution control upper limit distance as the difficulty in detecting a front vehicle increases, and increases the light distribution control upper limit distance as the difficulty in detecting a front vehicle decreases.

* * * * *